United States Patent [19]

Sharp, Sr.

[11] 4,237,857
[45] Dec. 9, 1980

[54] WASTE GREASE TRUCK AND METHOD

[76] Inventor: Eugene F. Sharp, Sr., Box 2129, Pontchatoula, La. 70454

[21] Appl. No.: 972,351

[22] Filed: Dec. 22, 1978

[51] Int. Cl.³ .................... B60H 1/02; B60H 1/22
[52] U.S. Cl. .................... 126/343.5 A; 126/19.5; 414/406; 414/422
[58] Field of Search ............ 414/406, 422, 420; 126/343.5 A, 343.5 R, 19.5

[56] References Cited

U.S. PATENT DOCUMENTS

| | | | |
|---|---|---|---|
| 834,944 | 11/1906 | Stevens | 126/343.5 A |
| 1,963,288 | 6/1934 | Ballert | 414/406 |
| 2,396,748 | 3/1946 | Pitman | 126/343.5 A |
| 2,690,172 | 9/1954 | Miller | 126/343.5 A |
| 3,359,971 | 12/1967 | Snelling | 126/343.5 A |
| 3,499,678 | 3/1970 | Richler | 126/343.5 A |
| 3,502,245 | 3/1970 | Hoffstetter | 126/343.5 A |
| 4,125,154 | 11/1978 | Franke et al. | 126/343.5 A |

FOREIGN PATENT DOCUMENTS 700805  3/1931  France ............ 126/343.5 A

*Primary Examiner*—Stephen P. Garbe
*Attorney, Agent, or Firm*—C. Emmett Puch & Associates

[57] ABSTRACT

An improved waste grease truck and method is disclosed wherein discarded fat and grease may be conveniently picked up from a restaurant and transported in the new and novel truck. The applicant's new and novel truck comprises a special body having a fully enclosed insulated tank with access means provided on the top of the tank for depositing the waste grease in the tank. The special body also has formed thereon novel positioning and dumping means for raising the full containers of waste grease into position to be dumped. The positioning and dumping means also has associated therewith heating means for heating the solidified containers of grease prior to dumping in order to be able to remove the solidified fat from the containers with ease. A novel means is provided for controlling the inside temperature of the tanks by utilizing a waste heat system connected to the exhaust system of the truck.

14 Claims, 5 Drawing Figures

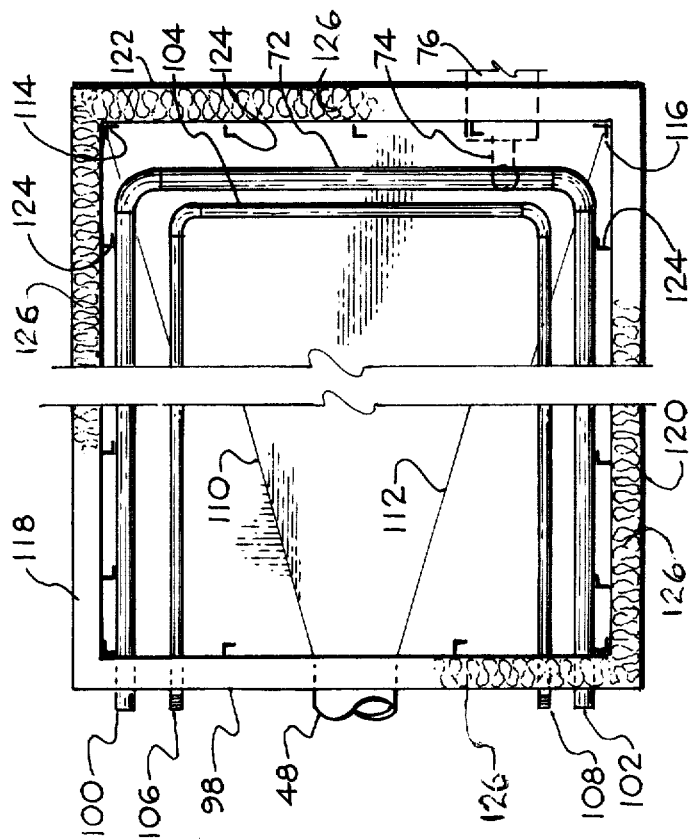
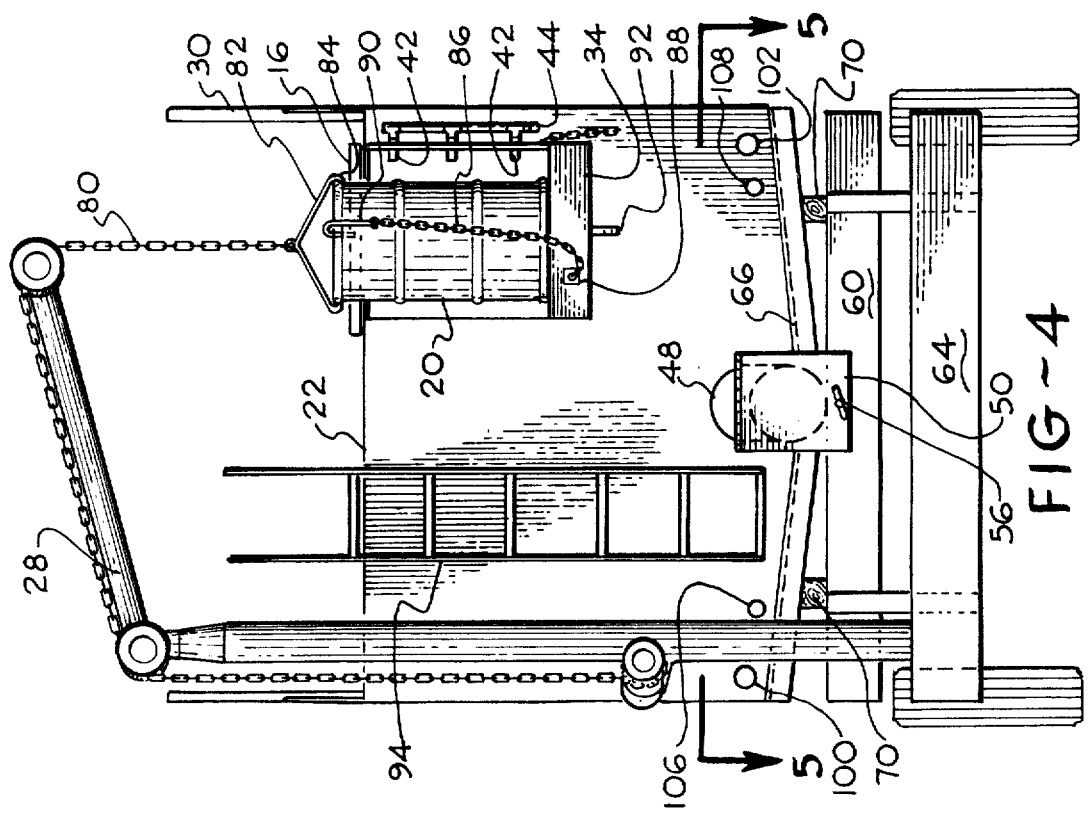

WASTE GREASE TRUCK AND METHOD

BACKGROUND OF THE INVENTION

This invention relates generally to collection systems and more particularly to a new and improved waste grease truck and method for collecting discarded fat from, for example, restaurants and transporting the fat to a remote location.

The accumulation of waste grease and fat from restaurants or the like requires that the fat be stored in large containers such as 55 gallon drums. The fat then solidifies in the drums and must be disposed of by the owner of the restaurant as the amount of waste grease accumulates.

In prior art collection systems, it is common for private contractors having flatbed trucks to contract to pick up the solidified containers of fat and to remove them to a remote location where they are emptied. This process requires that a large number of empty drums be placed on the flatbed truck before it leaves on a collection run with the contractor then picking up a full solidified drum of fat and leaving an empty drum in its place.

It is apparent that this process is cumbersome and time-consuming since the drums have to be stored at the contractor's warehouse and must be placed on the truck before its initial collection run and also must be taken off of the truck after the run is completed. In addition, during the picking up of the solidified grease drums, continuous shuffling around of full drums and empty drums must be completed. As the fat in the collected drums solidifies and is usually solid when collected, each drum must also be heated at the contractor's warehouse in order to melt the contents sufficient to permit removal of the contents from the drum at the remote location. Upon arrival at the remote location, all of the drums of collected waste grease must be then collected and deposited in one large, flame-heated vat or reservoir at the warehouse.

SUMMARY OF THE INVENTION

In order to overcome the problems inherent in the before described prior collection system, there has been provided by the subject invention a new and novel waste grease truck and method for utilizing the truck. The new and improved truck in the embodiment shown herein comprises a special body having a fully enclosed insulated tank with a pivotable door formed in the top of the tank. An upwardly movable hoist platform is positioned on the rear of the tank and beneath the door with the platform being pivotable so that a container of used grease may be placed upon the platform and raised upwardly and tilted so that the contents of the container may be dumped through the door into the tank. As the container is raised upwardly, a series of heating torches which are attached to the hoist platform heat the outside of the container to release the solidified grease from the container sufficiently so that the grease may be easily dumped into the tank. A waste heat system is provided for the tank to control the inside temperature of the tank during transmission of the waste grease to the ultimate dumping station with the waste heat system comprising a utilization of the exhaust system of the truck whereby the exhaust system is run through the tank proper to withdraw heat from the exhaust into the tank before expelling the exhaust gases to the outside of the tank.

Upon arrival of the specially constructed truck with its contents of melted waste grease at the dumping station, a specially constructed sloped bottom surface in the tank aids in removing the melted grease from the tank through an outlet pipe which extends to the outside of the tank.

The new and novel method herein taught utilizes this new and novel collection truck to greatly simplify the collection of waste grease as will be apparent from a review of the drawings of the application and from a reading of the description of one embodiment of the invention.

Accordingly, it is an object and advantage of the invention to provide a new and novel waste grease truck which greatly simplifies the collection of waste grease from restaurants or the like.

Another object and advantage of the invention is to utilize the new and novel waste grease truck in a new and novel collection system which allows a large reduction in overall costs of fat and grease collection.

Still yet another object and advantage of the invention is to provide a new and improved waste grease truck utilizing a novel waste heat collection system to melt partially solidified grease contained in the truck and to keep the grease melted during transmission to the ultimate dumping area.

These and other objects and advantages of the invention will become apparent from a review of the drawings of the invention and from a reading of the description of one embodiment of the invention.

BRIEF DESCRIPTION OF THE DRAWING

For a further understanding of the nature and objects of the present invention, reference should be had to the accompanying drawing, in which like parts are given like reference numerals, and wherein:

FIG. 4 is an end view, taken along Line 4—4 of FIG. 1 showing the hoist utilized in the subject invention and further showing the sloped bottom surface of the fully enclosed tank; and FIG. 5 is a sectional view, taken along Line 5—5 of FIG. 4 showing details of the insulated, fully enclosed tank and showing further details of the sloped bottom surface of the tank and positioning of the waste heat system of the invention.

DESCRIPTION OF ONE EMBODIMENT OF THE INVENTION

Figure 1:
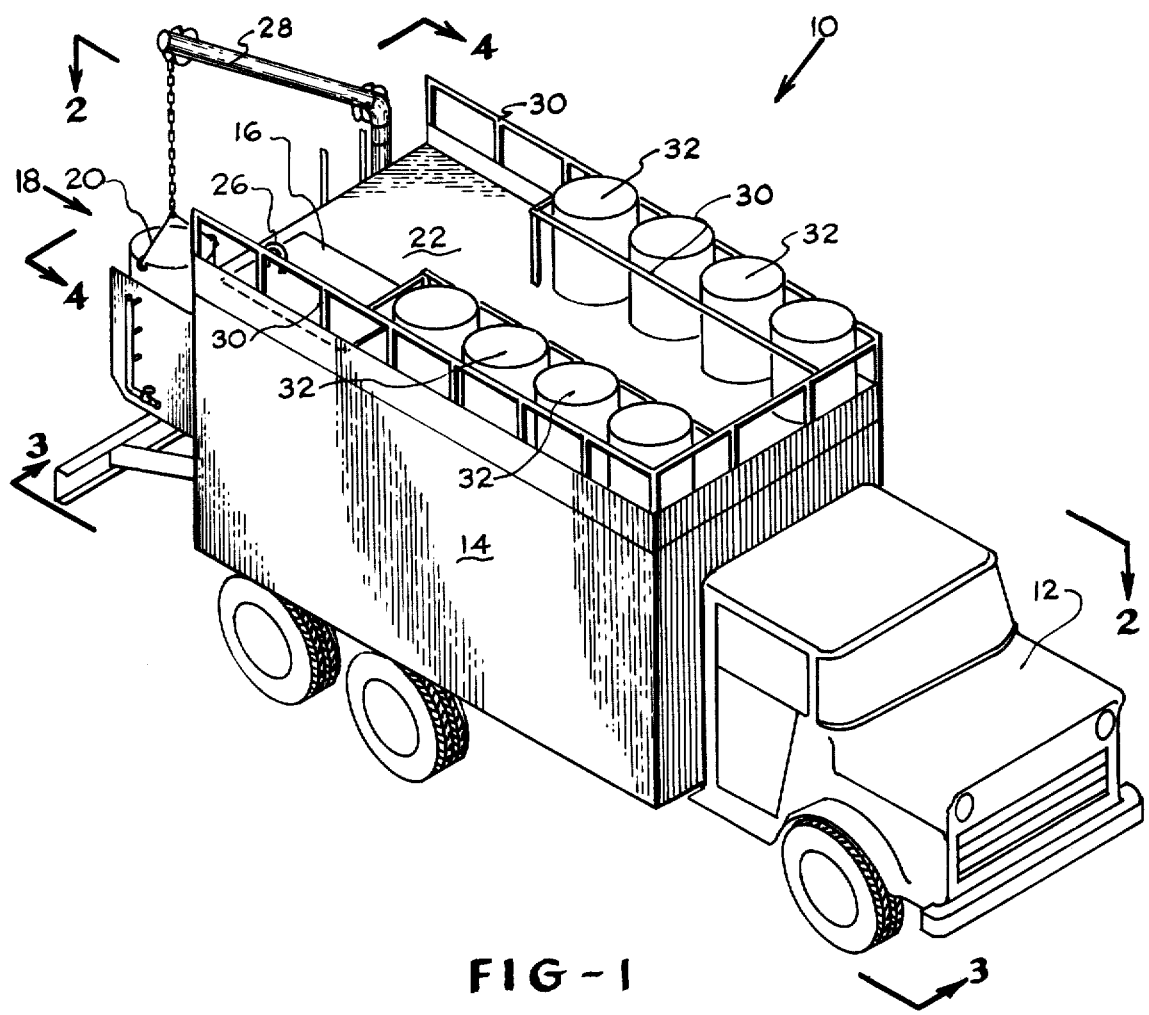
FIG. 1 is a perspective view of the subject invention showing the special body position on the collection truck and showing a plurality of empty containers positioned on top of the body.

Referring now to FIG. 1 of the drawing, there is shown a perspective view of the subject invention shown generally by the numeral 10 which comprises a truck 12 of the type well known, having a self-contained motor mounted on a bed plate to which may be affixed various sizes and types of truck bodies. The applicant's truck has positioned thereon a special body 14 in the form of a fully enclosed tank which is insulated throughout for the reason which will be hereinafter described. The tank 14 contains access means 16 in the form of a pivotable door which is mounted in the upper portion of the tank 14. The tank 14 also contains positioning and dumping means, shown generally by the numeral 18 for receiving full containers 20 and for raising the containers to the top of the tank 14 and dumping the contents of the containers into the tank 14 through the opened door 16. The positioning and dumping means in the embodiment shown in the drawings is formed as a movable hoist platform which is positioned at the rear of the tank and is located beneath the door 16 and will be described more fully hereinafter. In addition, the positioning and dumping means has associated therewith heating means for heating the full containers 20 before dumping them in order to release solidified fat or grease from the containers prior to dumping. The heating means will be shown more fully when referring to FIG. 3 of the drawing.

The applicant's new and novel waste grease truck also comprises means for controlling the inside temperature of the tank 14 in order to completely melt the waste grease that has been dumped into the tank so that it may be easily removed at a remote location from the tank. This will be described more fully hereinafter when referring to FIGS. 3 and 5 of the drawing and when referring to the auxiliary waste system utilized in the applicant's truck.

Figure 2:
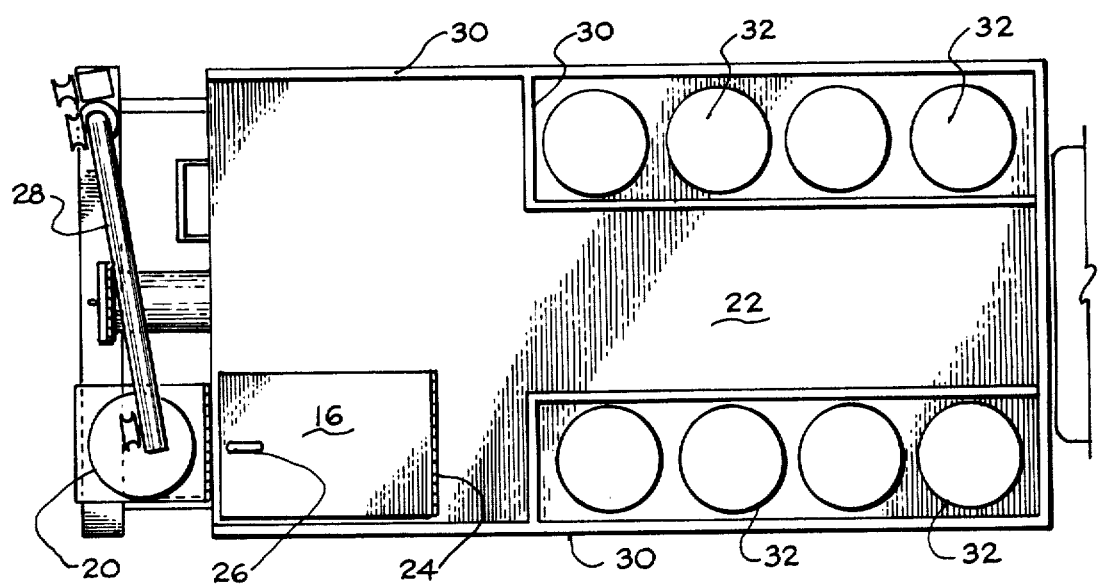
FIG. 2 is a top view, taken along Line 2—2 of FIG. 1 showing the placement of empty containers on the special body and also showing the position of the access door to the enclosed tank.

Referring now to FIG. 2 of the drawing, there is shown a top view, taken along Line 2—2 of FIG. 1 showing the location of the access door 16 on the top surface 22 of the tank 14. As has been before mentioned, the door 16 is pivotable by means of the hinge 24 and in addition has welded on the top thereof an eye 26 which may be used as a handle or by the hoist 28 to lift the door 16 to an open position.

The top surface 22 of the tank 14 also has formed thereon a plurality of railing sections 30 which are utilized to contain a plurality of empty containers or barrels 32 which may be stored on the top surface 22. The empty containers 32 may then be used to provide an empty container to the restaurant owner should he desire one if his need for extra containers becomes greater than normal.

Figure 3:
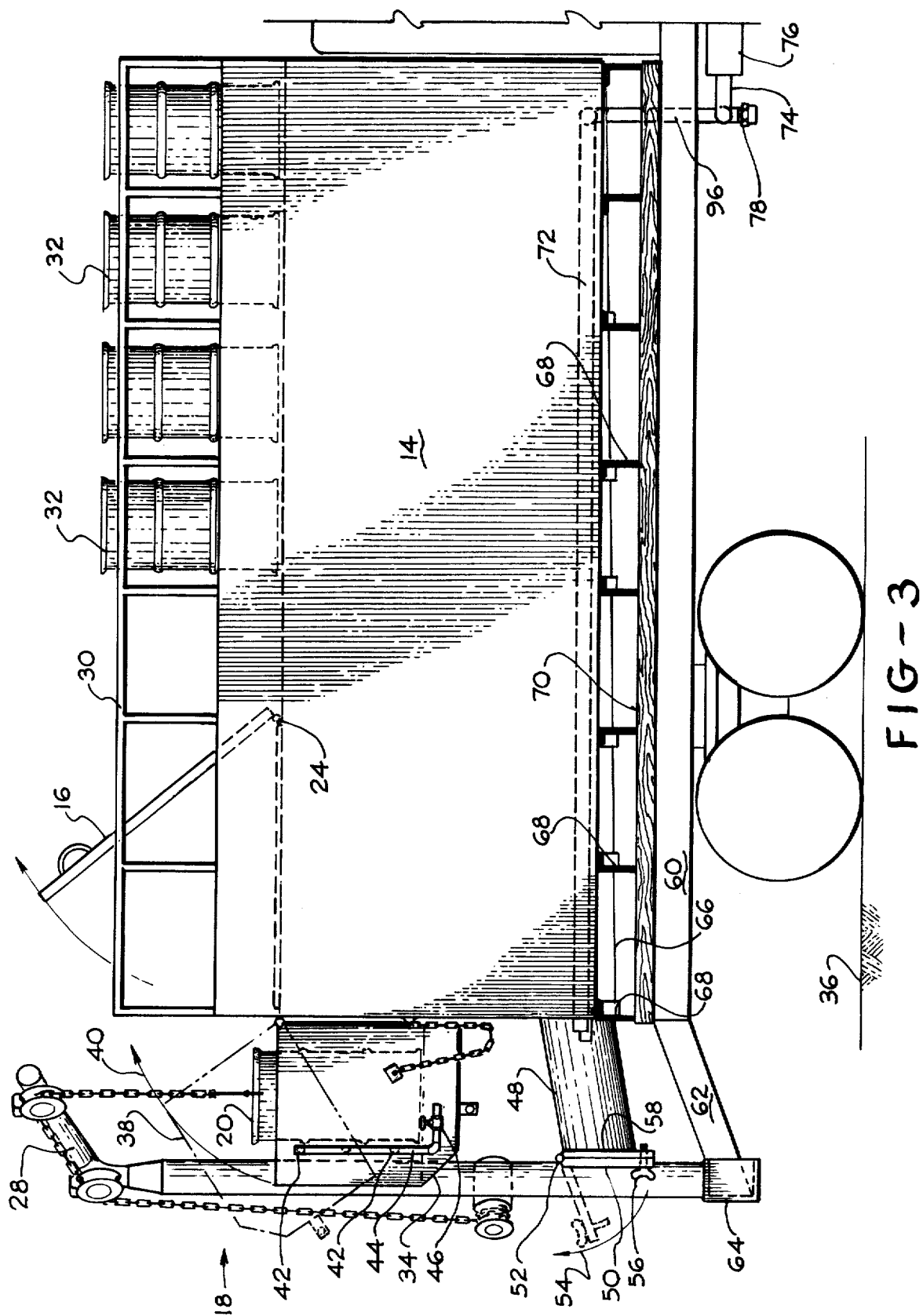
FIG. 3 is a side view, taken along Line 3—3 of FIG. 1 showing the placement of the positioning and dumping means at the rear of the fully enclosed tank and showing in dashed lines a dumping of the positioned container so that fat contained in the container may be dumped into the tank.

Referring now to FIG. 3 of the drawing, there is shown a side view, taken along Line 3—3 of FIG. 1, showing in greater detail the various new and novel features of the applicant's invention.

The positioning and dumping means 18 comprises in the embodiment shown a movable hoist platform 34 which is positioned on the rear of the tank 14 and is located beneath the door 16. The intimate details of the hoist platform 34 are not shown in the drawings, and it is sufficient to say that the placed platform 34 is capable of raising a full container 20 from the ground 36 by hydraulic means, electric means or other means known in the hoisting art to a position shown in FIG. 3 of the drawing whereby it may be tilted to dump the contents of the container 20 into the tank 14 through the door 16. As shown in FIG. 3, the dashed lines 38 indicate the general position of the movable hoist platform 34 as it is being pivoted in the direction shown by the arrow 40. A greater explanation of the pivoting and dumping of the container 20 will be given hereinafter when referring to FIG. 4 of the drawing which shows the utilization of the hoist 28 to obtain the necessary dumping.

As has been mentioned before, the positioning and dumping means also has associated with it heating means in the form of a plurality of torches 42 which are mounted on the platform 34 and are connected by means of a pipe 44 to a valve 46 which in turn connects to a source of fuel such as propane which is utilized to ignite the torches 42. When the full container 20 is placed on the movable hoist platform 34, the torches 42 are lit and are directed onto the exterior of the full container 20 in order to partially melt the solidified contents of the container so that whenever the container is dumped as shown in FIG. 3, the solidified fat and grease may easily drop out of the container 20 into the tank 14 through the opened door 16.

The tank 14 also has formed thereon means for removing the previously dumped waste grease from the interior tank which comprises an outlet pipe 48 which is welded to the tank 14 and has located on the end thereof a pivotable door 50 which is pivoted by means of the pivot 52 so that it may be swung upwardly in the direction shown by the arrow 54 whenever it is desirous to empty the tank. A lockscrew 56 is utilized to tightly fix the door 50 against the backing plate 58 which is welded to the end of the outlet pipe 48.

It can also be seen that the hoist 28 is fixedly attached to the bedplate 60 of the truck 12 by means of the downwardly extending frame 62 and the channel 64. The tank 14 may be constructed with a bottom surface 66 which sits on a plurality of brackets 68 which are in turn fastened to a plurality of 4 by 4 timbers 70 mounted on the bedplate 60 of the truck. As has been mentioned before, the entire tank 14 is insulated and it can be seen how the insulation for the bottom surface 66 may be placed within the plurality of upstanding brackets 68 and on top of the 4 by 4 timbers 70.

The tank also has positioned therein on the bottom surface 66 a U-shaped pipe 72 which forms the means for controlling the inside temperature of the tank during transmission of the waste grease to an ultimate dumping station. The U-shaped pipe will be described more fully hereinafter and it is sufficient to say at this point, when referring to FIG. 3 of the drawing, that the U-shaped pipe 72 is connected to the tailpipe 74 of the exhaust system of the truck 12 in proximity to the muffler 76 of the truck. At the intersection of the connection, there is also provided a plug 78 into the "T" joint 74 which may be removed in order to bypass the exhaust so that the heat does not move through the coils. When this is desired, the plug 78 is simply removed and the heat exits out the then open pipe or line 78 directly into the ambient. Such a condition is desirable when there is no grease in the tank 14. It is noted that the bypass line 78 can be directed straight backward rather than downwardly as shown in FIG. 3.

A secondary source of heat for the grease tank 14 is provided by auxilliary U-shaped line 104. When additional heat is needed or desired, a source of heat, for example a blow torch or propane torch, is used to direct the torch's flames into the open lines 106, 108 further heating the grease in the tank 14. Such a condition would occur when the exhaust system of the truck 12 is not sufficient to melt all of the grease contained in the tank 14 so that the grease may be removed through the outlet pipe 48.

An alternate embodiment of the exhaust system would be to include a standard type vertical exhaust line with a pressure actuated, rain cap on the top of it, and with an open "T" joint at the bottom of it going to the U-shaped pipe 72 with spring-actuated, latch caps over the ends 100, 102. In this alternate embodiment, when heat to the tank was desired, the end caps would be open and the exhaust heat would then flow through the U-shaped pipe 72. When heat was not desired, the spring latch end caps would then be closed; and the exhaust, opening the rain cap with its internal pressure, would then directly flow up and out the vertical exhaust line to the ambient.

Referring now to FIG. 4 of the drawing, there is shown an end view of the subject invention, taken along Line 4—4 of FIG. 1 showing the movable hoist platform 34 and its position relative to the access door 16 in the top surface 22 of the tank 14. It is within the spirit and scope of the invention as has been before mentioned that the hoist platform 34 may be raised and lowered by pneumatic means, electric means, and also may be raised and lowered by means of the hoist 28 having attached thereto a chain 80 which is connected to a plurality of hooks 82. The hooks 82 are positioned underneath the upper lip 84 of the full container 20 which may be the usual 55 gallon drum or other similar container. In order to prevent the full container 20 from falling from the hoist platform 34 whenever it is pivoted to the position shown in FIG. 3 of the drawing prior to dumping the contents of the full container 20 into the tank 14, there is provided a chain 86 which is welded to the hoist platform 34 at the position shown by the numeral 88 in FIG. 4. The other end of the chain 86 is fastened to a hook 90 which is positioned over the upper lip 84 and holds the full container 20 on the hoist platform 34.

The hoist platform 34 also contains a welded eye 92 at the bottom thereof which may be used in one embodiment as a means for tilting the platform 34 in order to dump the contents of the full container 20 into the tank 14.

Access to the top surface 22 of the tank 14 is provided by means of a ladder 94 which allows the operator of the truck to go to the top of the tank in order to remove an empty container 32 from the railing 30 when it is desired.

It can also be seen in FIG. 4 of the drawing how the bottom surface 66 of the tank is formed with a slope downwardly so that the bottom surface 66 terminates at the outlet pipe 48 which is also sloped downwardly as shown in FIG. 4 and as is also shown in FIG. 3 of the drawing.

Referring now to FIG. 5 of the drawing, there is shown a sectional view, taken along Line 5—5 of FIG. 4, showing the interior of the tank 14 and the location of the U-shaped pipe 72 positioned on the bottom surface 66 of the tank 14. As has been before mentioned, the U-shaped pipe 72 is attached to the tailpipe 74 of the exhaust system of the truck 12, and this attachment is by means of the downwardly extending pipe 96 which may be seen more clearly in FIG. 3 of the drawing also. It can be seen in FIG. 5 how the U-shaped pipe 72 is laid on the bottom surface 66 of the tank 14 around the periphery of the walls and extends through the rear wall 98 to the exterior of the tank at the positions shown by the numerals 100 and 102. It can then be observed that the exhaust from the exhaust system of the truck 12 would thereby be channeled through the tailpipe 74 and through the vertical pipe 96 into the U-shaped pipe 72 where it would exhaust to the outside of the tank and the radiated heat from the U-shaped pipe 72 would form a waste heat system to keep the collected grease and fat lying in the tank 14 in a liquid state so that it may be removed through the outlet pipe 48 at the proper time. It may also be desirous to have a second U-shaped pipe 104 positioned in proximity to the first U-shaped pipe 72 which also terminates at its two ends at the exterior of the rear wall 78 in the location shown by the numeral 106 and 108. The second U-shaped pipe 104 may then be utilized with an external steam source or other heating means as mentioned above in order to supplement the heat to the interior of the tank 14 should it be necessary at the dumping station.

It can also be seen in FIG. 5 how the bottom surface 66 is formed having an optional sloping surface formed by means of the intersecting lines 110 and 112 which initiate at the corners 114 and 116 and terminate at the outlet pipe 48. A two inch drop or slope would be exemplary. It can also be seen how the vertical side walls 118 and 120 as well as the vertical front wall 122 may be constructed and fastened to a plurality of upstanding angles 124 and may also be insulated by means of the insulation 126 which is also applied to the vertical rear wall 98.

From the foregoing it can be seen that the new and novel waste grease truck of the subject invention may be utilized to provide a new and improved method for collecting waste grease using a collection vehicle and transporting the grease to a remote location and removing it from the collection vehicle which comprises basically the steps of providing a specially constructed tank truck having the applicant's hoisting platform positioned on the outside thereof. The tank on the truck is fully enclosed and has positioned thereon a pivotable door and also controlling means for controlling the temperature inside the tank. After providing a heating source on the hoisting platform to heat the exterior of the waste grease containers, the full containers are positioned on the hoisting platform and raised into position in proximity to the door while the exterior surface of the container is heated to melt a portion of the grease in the container.

Thereafter the waste grease from the container is dumped into the tank through the door and the empty container is returned to its user. This procedure is repeated until it is desirous to transport the partially full or full tank of waste grease to a remote location, and while the tank is being filled and also being transported to the remote location, the inside temperature of the tank is controlled by means of the waste heat system so that whenever it is desirous to empty the tank, the grease remains in a melted condition. The tank is thereby transported to a remote location and the melted contents are emptied from the tank by means of the outlet pipe contained in the tank.

From the foregoing, it can be seen that there has been provided by the subject invention a new and novel waste grease truck and method utilizing the novel truck which accomplishes all of the advantages of the invention. It should become obvious that changes may be made in the respective parts of the invention and the steps of the method without departing from the spirit and scope of the invention and the applicant's invention is not to be limited to the embodiment described which has been shown by way of illustration only.

Having described my invention, I claim:

1. A waste grease truck, comprising:
    (a) a truck having positioned thereon a special body, the body comprising, (1) a fully enclosed tank and having positioned thereon insulation surrounding the tank, (2) means, associated with the tank, for access to the interior of the tank;

(b) means, associated with the tank, for positioning and dumping full containers of waste grease into the interior of the tank through the access means, the positioning and dumping means further comprising means, associated therewith, for heating the containers before dumping to release solidified fat from the containers prior to dumping;

(c) means, associated with the tank, for controlling the inside temperature of the tank during transmission of the waste grease to a ultimate dumping station; and (d) means, associated with the tank, for removing the previously dumped waste grease from the interior of the tank.

2. The grease truck as defined in claim 1 wherein the access means comprises a pivotable door positioned in the upper portion of the tank.

3. The grease truck as defined in claim 1 wherein the positioning and dumping means comprises a movable hoist platform positioned on the rear of the tank and located beneath the access means.

4. The grease truck as defined in claim 3 wherein the positioning and dumping means further comprises a hoist positioned on the rear of the truck and the hoist platform is pivotable and has formed on the bottom thereof an eye for use by the hoist for dumping the containers into the interior of the tank.

5. The grease truck as defined in claim 1 wherein the heating means comprises at least one torch mounted on the positioning and dumping means.

6. The grease truck as defined in claim 1 wherein the controlling means comprises an auxiliary waste heat system positioned within the tank and connected to the exhaust system of the truck.

7. The grease truck as defined in claim 6 wherein the auxiliary waste heat system comprises the exhaust system of the truck being connected to an extended pipe system positioned in association with the bottom of the tank and extending outside the tank for exhausting hot gases through the U-shaped pipe to the atmosphere.

8. The grease truck as defined in claim 7 further comprising a removable plug being positioned in the U-shaped pipe in proximity to the exhaust system for providing a by-pass for the source of heat to the U-shaped pipe.

9. The grease truck as defined in claim 7 further comprising a second U-shaped pipe being positioned in the bottom of the tank for connection to an external steam supply.

10. The grease truck as defined in claim 7 further comprising a secondary source of heat including a second extended pipe system positioned in association with the bottom of the tank and having an end with opening means easily available to the exterior of the tank for insertion of a supplemental heat source such as for example a blow torch.

11. The grease truck as defined in claim 1 wherein the removing means comprises in part the tank being constructed with a sloping bottom and further comprises an outlet pipe being fixedly attached to the sloped bottom and extending to the exterior of the truck for easy removal of the grease.

12. The grease truck as defined in claim 1 further comprising a plurality of empty containers being positioned on the top exterior portion of the tank.

13. A waste grease truck, comprising:
(a) a truck having positioned thereon a special body comprising a fully enclosed insulated tank having a door formed in the top of the tank;
(b) an upwardly movable hoist platform positioned on the rear of the tank and beneath the door, the platform being pivotable so that a container placed on the platform may be raised upwardly and tilted so that the contents of the container may be dumped through the door into the tank;
(c) at least one torch positioned on the hoist platform for heating the container to release solidified grease from the container interior to aid in dumping;
(d) means, associated with the tank, for controlling the inside temperature of the tank during transmission of the waste grease to an ultimate dumping station; and
(e) a sloped bottom surface formed on the bottom of the tank and terminating in an outlet pipe extending to the outside of the tank for removing the previously dumped waste grease from the interior of the tank.

14. A method for collecting waste grease using a collection vehicle, transporting the grease to a remote location and removing it from the collection vehicle, comprising the steps of:
(a) providing a specially constructed tank truck having a hoisting platform positioned on the outside thereof, the tank being enclosed and having positioned thereon a pivotable door and also means for controlling the inside temperature of the tank;
(b) providing a heating source on the hoisting platform to heat the exterior of the waste grease container;
(c) positioning a full container of solidified waste grease on the hoisting platform and raising it into position in proximity to the door;
(d) heating the exterior surface of the container while raising it on the hoisting platform to melt a portion of the grease in the container;
(e) dumping the waste grease from the container into the tank through the door;
(f) returning the empty container to the user thereof;
(g) repeating Steps (c) to (f) until it is desirous to transport the tank to a remote location;
(h) controlling the temperature in the tank while repeating Steps (c) to (g) so that the dumped contents of the containers are melted in the tank;
(i) transporting the tank to a remote location; and
(j) emptying the melted contents of the tank at the remote location.

* * * * *